July 19, 1938.  A. KLEIN  2,124,036
CONTAINER
Filed Oct. 3, 1936  2 Sheets-Sheet 1
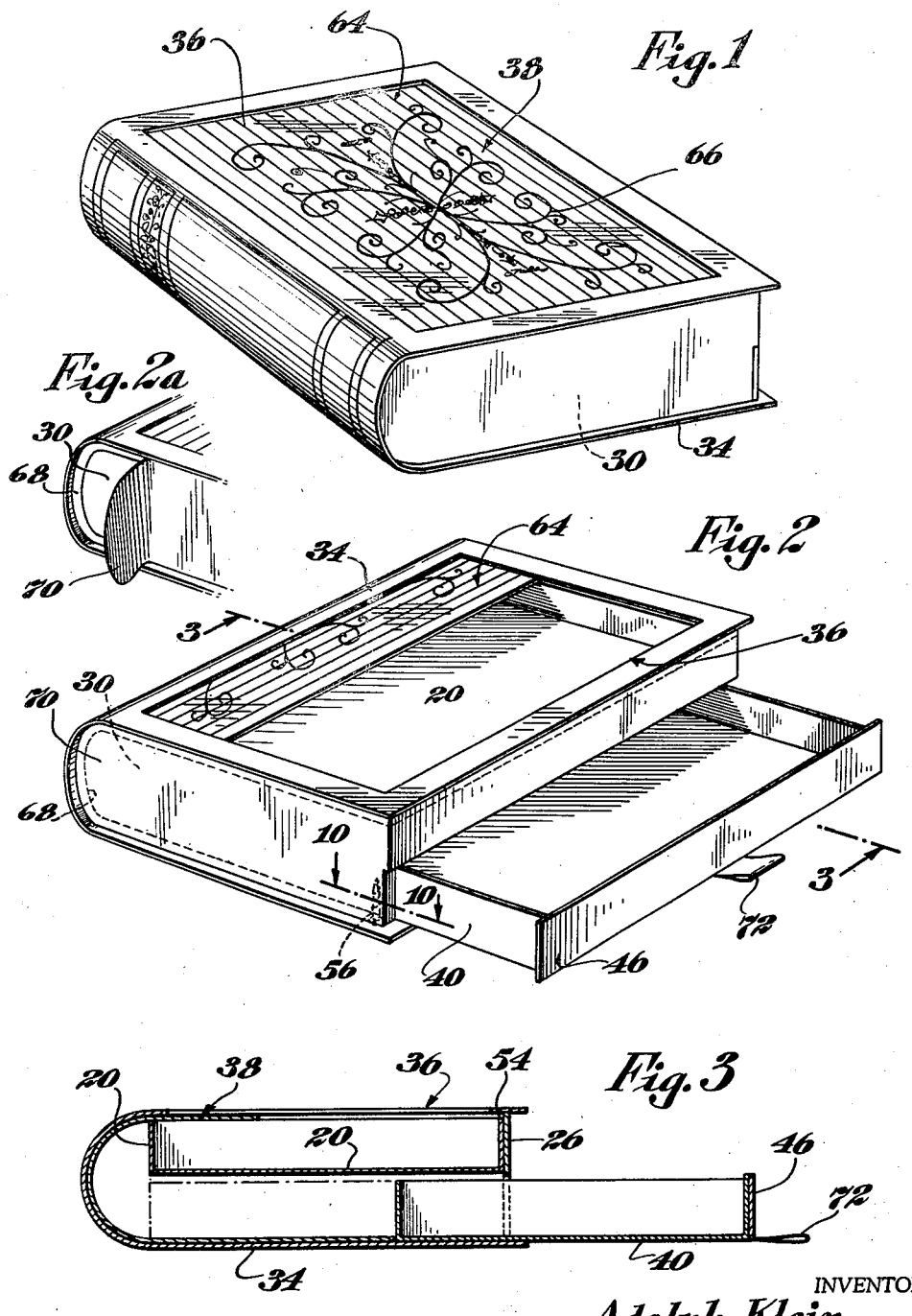
INVENTOR,
Adolph Klein,
BY
ATTORNEY.

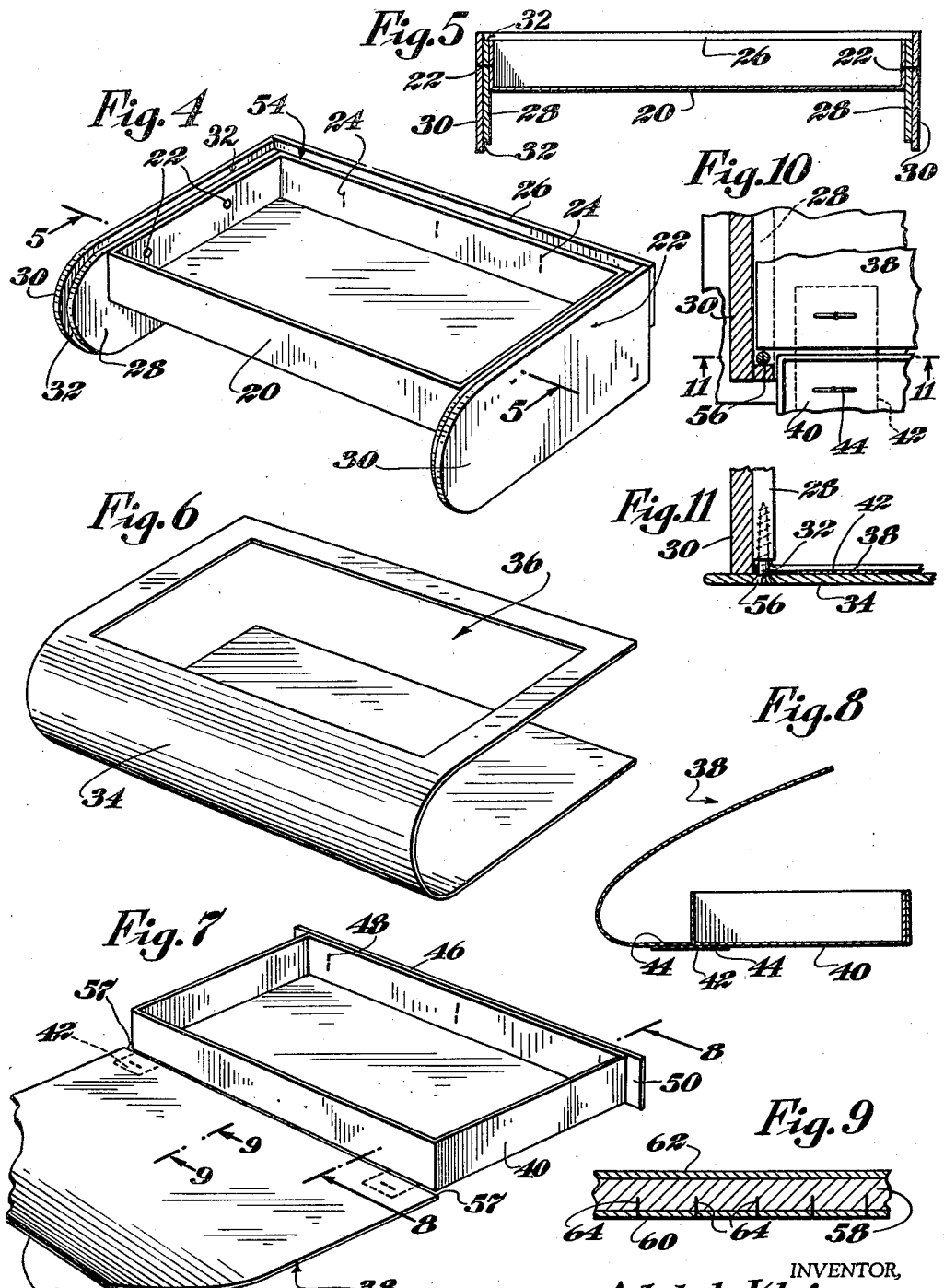

Patented July 19, 1938

2,124,036

UNITED STATES PATENT OFFICE 2,124,036

CONTAINER

Adolph Klein, New York, N. Y., assignor to A. Klein & Co. Inc., a corporation of New York Application October 3, 1936, Serial No. 103,809

7 Claims. (Cl. 229—10)

This invention relates in general to containers and in particular to containers having a plurality of compartments therein, one of which is movable.

Among the objects of my invention is the provision of a container having a plurality of compartments therein that are movable relatively to each other, the provision of a container in which access to two compartments is effected simultaneously by movement of the compartments relatively to each other and further the provision of a container of the type herein disclosed that will be low in manufacturing cost and attractive in appearance.

For the attainment of these objects and such other objects as will hereinafter appear or be pointed out, I have disclosed an illustrative embodiment of my invention in the drawings in which:

Figure 1 shows my container in perspective in closed position;

Figure 2 is a perspective view of my container in a different position from that of Figure 1 and showing the same in partly opened position;

Figure 2a shows a constructional detail;

Figure 3 is a sectional view on the line 3—3 of Figure 2 looking in the direction of the arrows;

Figure 4 is a view in perspective of an assembly of elements constituting a part of my container;

Figure 5 is a sectional view on the line 5—5 of Figure 4 looking in the direction of the arrows;

Figure 6 is a perspective view of one of the elements of my container;

Figure 7 is a perspective view of another assembly of elements constituting a portion of my container;

Figure 8 is a sectional view on the line 8—8 of Figure 7, looking in the direction of the arrows;

Figure 9 is a sectional view on the line 9—9 of Figure 7, on a greatly enlarged scale, looking in the direction of the arrows;

Figure 10 is a sectional view on an enlarged scale, on the line 10—10 of Figure 1, looking in the direction of the arrows, of a constructional detail; and Figure 11 is a sectional view on the line 11—11 of Figure 10, looking in the direction of the arrows.

The illustrative embodiment of my invention herein disclosed, may, in general, be described as a container having an outer casing in which is fixedly mounted a compartment or tray, and this compartment is of such size that it occupies the upper portion of the outer casing, which is open at the top so as to expose this fixed compartment. Slidable into the casing and within the space beneath the fixed compartment is a movable compartment connected in such a way to a flexible cover that when the movable compartment is inserted into the space in the outer casing intended for it, the flexible cover will be guided by means of a suitable arrangement provided in the outer casing into a position in which it closes the open top of the outer casing and thereby covers the fixed compartment.

In order to provide for an attractive and characteristic appearance, the disclosed embodiment is shown as simulating a closed book in conformation and embellishment.

Referring now to the drawings, it will be observed that Figures 1 and 2 show perspective views of my container from different aspects. In Figure 1 the container is shown in its closed position, and the very effective simulation of a book clearly appears therein. In Figure 2, which is a view showing the front of the container, the lower compartment is shown as partly drawn out, and at the same time the fixed upper compartment is shown as partly uncovered. Attention may be here called to the ornamental features shown by way of example in the drawings involving the decoration of the flexible cover constituting the top of the book, and the decoration at the back or curved part of the container, the latter simulating the customary appearance of the back of a book.

In describing constructional details of my container, it will be convenient to commence by describing individual elements or groups of elements, such as are formed during the course of manufacture.

For this purpose I will refer first of all to Figure 4, which shows an assembly of elements comprising a tray or box-like compartment 20, the two ends of the container, and the front of the container. The compartment 20 is the one referred to hereinabove as the fixed compartment, and is shown as of conventional box form with rectangular bottom and sides, and open at the top. To this tray are joined in any suitable or preferred manner, as for example by rivets 22 and staples 24, a pair of end pieces and a front piece 26. The end pieces are each constituted by a pair of elements 28 and 30 both similarly contoured, but one being wider and longer than the other so that when they are assembled as shown in Figures 4 and 5, a rectangular groove or recess 32 of uniform depth will run along the upper, the lower and the rear edge of the assembled end pieces, its bottom being constituted by the smaller end piece 28. It will further be observed that due to the rounded rear end of the pieces 28 and 30, the groove 32 will be of U conformation, this conformation serving a purpose to be presently described. It will further be observed that the front piece 26 has its upper edge positioned on a level with the upper edges of the pieces 30, but above the upper edge of the tray 20 so that a groove or channel 54 is formed, which, as will hereinafter appear, may be found desirable for certain purposes.

In Figure 6 is shown an element 34 constituting the upper, lower and curved rear walls of the outer casing and it will be observed that this is shown as in one piece (although not necessarily so, of course) and as having a U-shaped cross section, so that it is adapted to fit over and engage the end pieces 30 to which it may be fastened in any suitable or preferred manner, as by gluing. When so joined to the assembly of Figure 4, a unit is formed comprising the complete outer casing and the fixed compartment.

An opening 36 is shown as provided in the upper walls of this element 34, so that, when it is in place over the assembly of Figure 4, the fixed compartment 20 will be uncovered, the opening being of suitable size for this purpose.

It will now be noted that when the element 34 is joined to the assembly of Figure 2 a groove will result intermediate the element 34 and the part 32 because of the groove 32 resulting from the difference in dimensions of the parts 28 and 30, as already described. This groove serves for the reception of the edge portions of a flexible cover or shutter 38, which is shown in Figure 7 as it appears before assembly. By referring to this figure and also Figure 8 it will be observed that the flexible cover is joined to the movable compartment 40, which is shown as a box-like tray similar to the fixed compartment 20, by means of strips 42 united to the compartment 40 and to the flexible cover by any suitable or preferred means, as, for example, staples 44. The compartment 40 is of such size that it will fit into the space between the bottom wall of the element 34 and the fixed compartment 20, and the flexible cover 38, as has already been stated, is of such width that its edge portions will be guided within the channels 32. It will further be clear that when these parts are inserted into the container, the advance portions of the flexible cover will be guided by the channels 32 first between the lower edge portion of the element 28 and the element 34, then around the curved back portions thereof, and finally along the top portions thereof, so that it will finally close the opening 36.

In order to limit the inward movement of the movable compartment 40 I have shown a member 46 attached to the front thereof by any suitable or preferred means, as by the staples 48, and this member is shown as having portions thereof extending laterally beyond the tray 40, which will prevent its being pushed into the outer casing beyond the point at which the extensions 50 of the member 46 engage the end walls 29 and 30, and in which position the member 46 will be flush with the front wall 26, and will, in effect, form a continuation thereof. When this position is reached, the opening 36 will be completely closed, as shown in Figure 1, it being understood, of course, that for this purpose the length of the flexible cover 38 is made sufficient. By making the flexible cover of such a length that when the tray 40 is completely inserted the free outer edge 52 of the cover will enter the groove 54 formed where the upper portion of the front piece 26 extends beyond the front wall of the fixed tray 20, a most effective closure for the fixed compartment is provided, and in addition an auxiliary stop means for preventing movement of the movable tray 40 too far into the container, will be provided.

In order to prevent complete withdrawal of the movable tray 40 I have provided stop means that become effective when the tray has reached a position near complete withdrawal. Such means will be seen to be highly desirable if it is remembered that disassembly of the flexible cover 38 and the tray from the body of the container would be very inconvenient. It is further desirable, from the standpoint of appearance, that the flexible cover be not exposed to view at all when the tray 40 is drawn out from the container. A stop means to prevent complete withdrawal of the tray 40 is indicated by way of example in the form of a screw, 56, provided at the front portion of each end of the container, and which will be engaged by the front corner portions 57 of the flexible cover 38.

By referring to Figures 10 and 11, which show the details of this construction, it will be observed that said screw 56 passes through the bottom portion of the element 34, through a groove 32 and into a member 28. Besides acting as a stop means each screw 56 also serves to reinforce the container, since it forms an effective means for joining the element 34 to an end piece 30.

Referring now to Figure 9, the details of the construction of the flexible cover 38 will be made clear. The construction there shown is particularly adapted for use where the cover is made of material such as pasteboard, and it will be observed that three layers of material are shown, the central one of which, 58, is pasteboard, while the layer 60 is intended to represent the decorative outer layer, and the layer 62 is a reinforcing backing, and may be of material that is strong enough and flexible enough for the purpose, such as strong "kraft" paper, for instance. A series of transverse scores or cuts 64 are then formed by suitable means, and these scores pass through the layer 60 and into the cardboard 58. I have found that by making the depth of the scores so that they extend approximately half way through the pasteboard 58, my purpose is effectively accomplished, as the cover then becomes sufficiently flexible without losing too much strength. Where paper is used for the layer 62 its effectiveness may be enhanced by laying it with its grain transverse to the scores.

Where the parts of my container are made of pasteboard, the decorative features thereof may be applied in the form of ornamental paper sheets and strips. The ornamental strip 60 for the flexible cover has already been mentioned, and this may simulate leather and have an ornamental design 66 embossed thereon in gold, as indicated in Figure 1. The other elements of the container both exterior and interior may of course also be decorated as desired and this feature requires no further description. However, attention will be called to the fact that in one respect, certain of the decorative features constitute constructional features as well. When pasting strips on the outer surfaces of the element 34, these strips may be made with extending edge portions 68 that are pasted over the edge portions of the element 34 and on the adjacent outer surface portions of the end elements 30, as may be observed by viewing Figure 2a. In this manner they serve to augment the gluing by which the element 34 is held to the end members 30 and the front member 26. In order to conceal these overlapping portions 68, the ornamental strip 70 is then pasted thereover so as to completely cover the members 30 and the portions 68. This construction is also indicated in Figure 2a, in which a strip 70 is shown as partly pasted in place.

It will now be observed that the overlapping portions 68 have no reinforcing function at the lower front portion of the container, since, because of the fact that the movable tray 40 enters the container here, there is no front wall at this point. The screws 56, described hereinabove as serving as stop members for the tray 40, will therefore be particularly useful at a point where the reinforcing action of the overlapping portions 68 is absent.

To secure convenience of manipulation I have shown a tab 72 applied at the front portion of the movable tray 40.

The illustrative embodiment described herein is particularly suitable where the materials used for its construction are paper products, such as paper, cardboard and pasteboard, and when such materials are used the assembly of the various elements is relatively simple, involving only stapling, riveting and pasting operations. On the other hand the production of the various elements constituting the container is also comparatively simple and rapid, involving little beyond simple die and bending operations, and requiring no complicated or expensive machinery. It will therefore be seen, that, in addition to a low material cost, the cost of assembly is also low, so that I am enabled to produce an attractive article at low cost.

However, it will be understood that while the construction of the container disclosed herein is particularly suited for manufacture from paper, cardboard and pasteboard, that it also has advantages when other materials are used.

While I have described one illustrative embodiment of my invention and illustrated the manner of making the same and its use, it will be understood that I do not limit myself to the constructional details, nor to the manner of making nor the use thereof, as these are illustrative merely and not to be construed in a limiting sense, and that my invention may be embodied in many other forms, and made and used in many other ways, as will be obvious to those skilled in the art, without departing from the spirit thereof, and that I do not limit myself in any way other than as called for by the prior art.

Having thus described my invention and illustrated its use what I claim as new and desire to secure by Letters Patent is:—

1. A container having two compartments therein, one of said compartments being movable, and the other compartment having a flexible cover, said container being in the form of a book having each end thereof constituted by two similarly contoured but differently dimensioned U-shaped pieces joined in superposed stepped relation so that one of them has its edge portions protruding beyond the other one, except at the side constituting the mouth of the U, and said container having side walls joined to the edge portions of the larger of the end pieces on all sides except the mouth of the U, a traylike compartment fixedly attached to said end pieces, and a movable compartment adapted to slide into the space beneath the fixed compartment and between the side walls, and a flexible cover member having its edge portions adapted to slide within the channels formed by the stepped portions of said end pieces and side walls.

2. A container comprising two U-shaped end members, top, bottom and rear walls in contact with said U-shaped members at the bight of the U and the top and bottom thereof, a channel formed in said end members where they meet said bottom, top and rear walls, a movable member adapted to slide between said end members and carrying a flexible shutter at the end thereof, said flexible shutter having its edge portions adapted to slide within said channel and an opening formed in the top wall adapted to be closed or opened by said flexible shutter.

3. A container having a pair of U-shaped end walls, and having side walls constituted by a single element, U-shaped in cross section, and said side wall element being joined to said end walls, said side wall element having an opening at one side thereof, a channel formed on the inside edge portions of each of said end members where it joins the side wall element, a flexible shutter extending between said channels and having its end portions slidable therein and adapted in one of its positions to close said opening.

4. A container having a body comprising a pair of end pieces, and side walls connecting said end pieces, said end pieces having a portion thereof offset in relation to other portions so as to form a channel between each of said end walls and said side walls, and said channels being adapted to slidably receive the end portions of a flexible shutter therewithin, and stop means in the form of a screw passing through said side walls, through the channel and into an end wall, and adapted to prevent the passage of said shutter, and said screw further serving to hold together said end wall and said side wall.

5. A container having a fixed compartment and a movable compartment, closure means for the fixed compartment in the form of a flexible sheet exterior to the movable compartment, and means connecting the movable compartment and the closure means for the fixed compartment, whereby said closure means will open the fixed compartment when the movable compartment is moved and said compartments being positioned in superposed relation.

6. A container open at the top and provided with a bottom wall and end walls, and having a U-shaped channel running along the outside of its two end walls, a movable compartment slidable between said end walls, a flexible closure for the open top of said container, means connecting said closure and said compartment so that they move together, the sides of said closure extending laterally beyond the sides of the compartment and into said channels and being slidable therein, and a member serving to unite said bottom and each of said end walls and positioned so as to pass through the channel in the path of the portions of the closure that extend into the channel, whereby it acts as a stop preventing the movement of said closure out of said channels.

7. A container having a middle partition dividing it into an upper section and a lower section, said upper section being open at the top and said lower section being open at the front, slidable closure means for said upper section whereby when the closure is in place it will form a closed compartment and a movable compartment slidable within the lower section and connected to said closure for the upper section so that when said movable compartment is moved it will move the closure for the upper section so as to either cover or uncover the same.

ADOLPH KLEIN.